US011942858B2

(12) United States Patent
Klintberg et al.

(10) Patent No.: US 11,942,858 B2
(45) Date of Patent: Mar. 26, 2024

(54) CONTACTOR FOR BATTERY PACKS

(71) Applicant: VOLVO TRUCK CORPORATION, Gothenburg (SE)

(72) Inventors: Anton Klintberg, Gothenburg (SE); Faisal Altaf, Västra Frölunda (SE); Tobias Smidebrant, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 5 days.

(21) Appl. No.: 17/660,296

(22) Filed: Apr. 22, 2022

(65) Prior Publication Data
US 2022/0352814 A1 Nov. 3, 2022

(30) Foreign Application Priority Data
Apr. 29, 2021 (EP) .................................. 21171108

(51) Int. Cl.
*H02M 1/34* (2007.01)
*B60L 3/00* (2019.01)
(Continued)

(52) U.S. Cl.
CPC ............ *H02M 1/34* (2013.01); *H01H 9/0271* (2013.01); *H01H 9/30* (2013.01); *B60L 3/0046* (2013.01); *H02J 7/0031* (2013.01)

(58) Field of Classification Search
CPC ......... H02M 1/34; H01H 9/0271; H01H 9/30; H01H 9/542; H01H 2009/546;
(Continued)

(56) References Cited

U.S. PATENT DOCUMENTS 6,765,316 B1    7/2004  Elsner et al.
10,850,725 B2 * 12/2020  Tabatowski-Bush ....................... B60W 20/13
(Continued)

FOREIGN PATENT DOCUMENTS

DE             603128 C       9/1934
DE        102014203476 A1 *   8/2015  ............... B60L 3/04
(Continued)

OTHER PUBLICATIONS

Giancaterino J: "Application considerations for multiple battery disconnects", Telecommunications Energy Conference, 2000. Intelec. Twenty-Second International Sep. 10-14, 2000, Piscataway, NJ, USA,IEEE, Sep. 10, 2000 (Sep. 10, 2000), pp. 765-770, XP010523272, ISBN: 978-0-7803-6407-3 Chapter 3. Disconnecting Multiple Battery Strings; p. 768-p. 769; figures 1,2.
(Continued)

*Primary Examiner* — Thienvu V Tran
*Assistant Examiner* — Sreeya Sreevatsa
(74) *Attorney, Agent, or Firm* — Venable LLP; Jeffri A. Kaminski

(57) ABSTRACT

A switching arrangement for reducing contactor wear of an energy storage system having a plurality of battery packs arranged in parallel for powering a load. The switching arrangement includes a contactor for each battery pack. The contactors connect and disconnect the battery packs relative to the load by closing and opening, respectively, an electric arc reducing circuitry associated to one of the contactors. The switching arrangement is configured to electrically disconnect the battery packs from the load by means of the contactors such that the contactor being associated with the electric arc reducing circuitry is opened last.

15 Claims, 4 Drawing Sheets

(51) Int. Cl.
  *H01H 9/02* (2006.01)
  *H01H 9/30* (2006.01)
  *H02J 7/00* (2006.01)

(58) Field of Classification Search
  CPC ...... B60L 3/0046; B60L 3/0069; B60L 50/60;
       B60L 58/19; H02J 7/0031; H02J 7/0063;
       H02J 7/34; Y02T 10/70; B60R 16/033;
       H02H 9/04; B60Y 2200/91
  USPC ..................................... 361/91.7; 324/424
  See application file for complete search history.

(56) References Cited

U.S. PATENT DOCUMENTS

| | | | |
|---|---|---|---|
| 11,046,189 B2* | 6/2021 | Curuvija | H02M 7/53871 |
| 2001/0033500 A1* | 10/2001 | Hummert | H02M 1/34 363/39 |
| 2007/0046233 A1 | 3/2007 | Kobielski | |
| 2007/0268640 A1 | 11/2007 | Brereton et al. | |
| 2011/0234006 A1* | 9/2011 | Deng | H01M 10/482 307/71 |
| 2012/0013182 A1 | 1/2012 | Minegishi et al. | |
| 2012/0306264 A1 | 12/2012 | Komma et al. | |
| 2013/0063091 A1 | 3/2013 | Nishi et al. | |
| 2013/0285456 A1 | 10/2013 | Feuerstack et al. | |
| 2018/0219391 A1* | 8/2018 | Ishikawa | B60L 58/19 |
| 2020/0290480 A1* | 9/2020 | Tsubaki | B60L 58/21 |
| 2020/0317076 A1 | 10/2020 | Wang et al. | |
| 2021/0096184 A1 | 4/2021 | Zenati et al. | |
| 2021/0098205 A1* | 4/2021 | Langer | H01H 9/16 |
| 2023/0016562 A1 | 1/2023 | Maarbjerg et al. | |

FOREIGN PATENT DOCUMENTS

| | | |
|---|---|---|
| EP | 2372867 A1 | 10/2011 |
| WO | 2014057011 A1 | 4/2014 |

OTHER PUBLICATIONS

European Search Report dated Oct. 7, 2021 in corresponding European Patent Application No. 21171095.9, 10 pages.
European Search Report dated Nov. 4, 2021 in corresponding European Patent Application No. 21171108.0, 7 pages.
U.S. Non Final Office Action dated Mar. 30, 2023 in related U.S. Appl. No. 17/660,314, 14 pages.

* cited by examiner

CONTACTOR FOR BATTERY PACKS

TECHNICAL FIELD

The present invention relates to a switching arrangement for reducing contactor wear of an energy storage system. The invention further relates to an energy storage system for a vehicle a switching arrangement, a vehicle, and to a method for operating a switching arrangement for reducing contactor wear of an energy storage.

BACKGROUND

A vehicle typically comprises an engine or machine for propelling the vehicle. The engine may be powered by various means, such as e.g. by a liquid or gaseous fuel in an internal combustion engine, or by electric power to an electric machine. Moreover, hybrid solutions exist in which e.g. the vehicle is propelled both by an internal combustion engine and an electric machine. In either way, an energy storage device is used to store the energy needed in order to propel the vehicle. Energy storage devices may further be used to power auxiliary loads in the vehicle.

For many vehicles, the energy storage devices are comprised in an energy storage system, wherein the energy storage system is configured to power the electric machine for propelling the vehicle, as well as any auxiliary load. For example, for an electric vehicle, the energy storage devices may be batteries, which are configured to operate the electric machine as well as electrically driven auxiliary equipment. The electric machine and/or the electrically driven auxiliary equipment may be commonly referred to as a load. Several batteries, or several series-connected and/or parallel connected battery cells, may be grouped into a battery pack. The battery pack is periodically in need of charging, and is then electrically connected to an electrical energy source, e.g. via plug directly connected to the power grid.

In many applications, several battery packs are configured to power the load by being parallelly connected to a traction power bus (or traction voltage bus). Hereby, the supplied power can be adapted based on the number of battery packs, and/or higher power requirements of the vehicle may be met. Typically, every battery pack is associated with a switch, or contactor, enabling connection and disconnection of each battery pack relative the load. Thus, when a contactor is closed, the associated battery pack is connected to the traction power bus and powers the load, and when a contactor is opened, the associated battery pack is disconnected from the traction power bus and does no longer power the load. However, every time the state of a contactor is changed from closed to open, or vice versa, the contactor is subject to mechanical and electrical wear.

The electric wear of the contactor is typically higher than the mechanical wear, and thus more significant for setting the life length of the contactor. Electric wear may e.g. origin from electric arcs in the air gap of a non-closed contactor. Electric arcs typically appear when the voltage over the air gap exceeds the breakdown voltage of air (3 kV/mm) or when an inductive circuit is broken since an inductor opposes a change of the current through it. The electric breakdown voltage will typically be exceeded when a contactor is opened under load since the air gap initially is zero. The resistivity of the resulting electric arc is low meaning that the electric arc will be sustained for a short time before it is interrupted. When a contactor is closed, on the other side, the electric breakdown voltage is typically exceeded just before the contactor reaches a fully closed state, resulting in a small electric arc. However, the electric wear originated by inductance can be much more severe than the wear from exceeding the electric breakdown voltage.

Contactor wear as described above may lead to contactor failure, which may be very expensive as sometimes more than the failing contactor have to be replaced. Thus, there is a need in the industry for reducing the contactor wear.

SUMMARY

It is an object of the present invention to at least to some extent alleviate the shortcomings discussed above in relation to known energy storage systems and battery packs, and to improve the operation of connecting and disconnecting the battery packs relative a load.

According to at least a first aspect of the present invention, a switching arrangement for reducing contactor wear of an energy storage system having a plurality of battery packs arranged in parallel for powering a load is provided. The switching arrangement comprises:
  a contactor for each battery pack, the contactors being configured to connect and disconnect the battery packs relative the load by closing and opening, respectively,
  an electric arc reducing circuitry associated to one of the contactors, wherein the switching arrangement is configured to electrically disconnect the battery packs from the load by means of the contactors such that the contactor being associated with the electric arc reducing circuitry is opened last.

Hereby, electric contactor wear may be reduced as the formation of electric arcs in the contactor associated with the electric arc reducing circuitry is reduced, or even prevented. During the disconnection of the battery packs from the load by means of the contactors, the battery packs are disconnected in a sequence in which one contactor is opened last and, if not being associated with an electric arc reducing circuitry, subject to increased disconnection wear due to the formation of electric arcs. The formation of such electric arcs is at least partly the result of residue energy, or residue inductance, remaining in the energy storage system subsequent to a shut-down of the load. In case the battery packs are configured to power an electric machine (i.e. the load is an electric machine), the most inductive part affecting the energy storage system is the electric machine and the cable connected to it. Thus, if no electric arc reducing circuitry is present, the electric arcs will be especially prominent in a scenario in which all battery packs of the energy storage system are being disconnected since the inductive circuit involving the electric machine will be interrupted or broken. In a scenario in which one battery pack is kept connected to the load, or a traction power bus, the formation of electric arcs during the disconnection of the other battery packs will be less prominent, as an alternative path of current is available (i.e. by the connected battery pack). By providing the contactor which is opened last with an electric arc reducing circuitry, or rather, by adapting the sequence in which the contactors are opened so that the contactor associated with the electric arc reducing circuitry is opened last, such increased disconnection wear due to the formation of electric arcs can be reduced or prevented. It should be understood that when referring to that a contactor is opened last, the last battery pack is disconnected from the load, and that after such disconnection, no battery pack is connected to the load. Thus, the switching arrangement is typically configured to electrically disconnect all of the connected battery packs from the load by means of the contactors such that the contactor being associated with the electric arc reducing circuitry is opened last.

It should be understood that the switching arrangement is configured to electrically disconnect the battery packs from the load by means of the contactors such that the contactor being associated with the electric arc reducing circuitry is intentionally opened last. Thus, the contactor being associated with the electric arc reducing circuitry is controlled, by the switching arrangement, to be opened last. The switching arrangement may e.g. comprise a control unit, such as an ECU, for controlling such operation.

According to at least one example embodiment, the electric arc reducing circuitry associated to one of the contactors is configured such that during a disconnection of the battery packs in such a way that the contactor being associated with the electric arc reducing circuitry is opened last, the residue energy, or residue inductance, is accumulated by the electric arc reducing circuitry instead of the contactor (which otherwise would lead to a formation of an electric arc in the contactor).

The contactor being associated with the electric arc reducing circuitry may be referred to as an electric arc reducing contactor, or an electric arc reducing associated contactor. Such terms will be used interchangeably throughout the application text. Alternatively, such contactor may be referred to as being comprised in an electric arc reducing contactor arrangement, wherein the electric arc reducing contactor arrangement comprises the contactor associated with the electric arc reducing circuitry, and the electric arc reducing circuitry. The battery pack which the electric arc reducing associated contactor is configured to connect and disconnect from the load, may be referred to as a battery pack being associated with the electric arc reducing circuitry, or electric arc reducing associated battery pack.

According to at least one example embodiment, the switching arrangement is configured to electrically connect the battery packs to the load by means of the contactors. That is, the contactors are closed to connect the battery packs to the load. According to at least one example embodiment, at least the electric arc reducing associated battery pack is connected to power the load. All of the battery packs need not to be connected each time, but preferably the electric arc reducing associated battery pack is connected each time as the electric arc reducing associated contactor is configured for achieving the reduced contactor wear.

According to at least one example embodiment, the battery packs are connected to a traction power bus, wherein each associated contactor is arranged between the corresponding battery pack and traction power bus. The traction power bus is electrically coupled to the load, such as e.g. directly coupled to the load.

According to at least one example embodiment, the switching arrangement comprises a connector connectable to an electrical energy source, such as the grid. Hereby, the battery packs of the energy storage system may be charged by the electrical energy source. Thus, the battery packs of the energy storage system are connectable to the electrical energy source, and are connectable to the load. In other words, the switching arrangement is configured to connect the energy storage system to the electrical energy source, and is configured to electrically power the load via the energy storage system by connecting the battery packs to transfer electrical energy from the battery pack to the load, and is configured to disconnect the battery packs from the load not to transfer any electrical energy from the battery packs to the load.

According to at least one example embodiment, the switching arrangement is configured to operate according to a schema. The schema may e.g. comprise the step of disconnecting the battery packs from the load by means of the contactors such that the battery packs are disconnected in a sequence in which electric arc reducing associated contactor is opened last. The time interval for the disconnecting sequence may e.g. be between 0 and 10 s, such as e.g. between 1 ms and 5 s, or between 1 ms and 3 s, or between 1 ms and 1 s, i.e. between 1 ms and 1000 ms, or between 100 ms and 1000 ms. For example, the switching arrangement may be configured to simultaneously, or almost simultaneously (e.g. within 50 ms), disconnect all the battery packs from the load by means of the contactors except for the electric arc reducing associated contactor, which is intentionally opened last (e.g. by being subject to lag compared to the other contactors).

According to at least one example embodiment, the contactor being associated with the electric arc reducing circuitry is arranged adjacent and in parallel to the electric arc reducing circuitry.

Hereby, the residue energy, or residue inductance, may in an advantageous way be accumulated by the electric arc reducing circuitry instead of being directed to the contactor. Such parallel configuration of the electric arc reducing circuitry and the electric arc reducing associated contactor provides a simple and straightforward circuitry.

According to at least one example embodiment, the electric arc reducing circuitry is a snubber circuit.

A snubber circuit is a circuit configured to suppress transients in electrical system, such as transients caused by the previously described residue energy, or residue inductance. According to at least one example embodiment, the snubber circuit is configured to suppress sudden interruption of current flow (i.e. due to the shut-off of the load, or inductive load) otherwise resulting in sharp rises in voltage across the contactor being opened last. Stated differently, the snubber circuit is configured to handle an inductive "kick" in the energy storage system.

According to at least one example embodiment, the snubber circuit is an RC circuit of a capacitor connected in series with a resistor.

Thus, the "R" in RC is referring to the resistor, and the "C" in RC is referring to the capacitor. Such snubber circuit may be referred to as an RC snubber circuit, which is a simple but yet effective circuit for suppressing transients in the energy storage system. The voltage across a capacitor cannot change instantaneously, so a decreasing transient current will flow through it, allowing the voltage across the electric arc reducing associated contactor to increase more slowly when opened, thereby prevent, or at least reduce, the build-up of an electronic arc. The RC snubber circuit may be a single component.

According to at least one example embodiment, the capacitor is sized and dimensioned to handle the residue inductance in the energy storage system.

That is, the capacitor in the RC snubber circuit may be sized and dimensioned in relation to the load and associated equipment, such that the residue energy or residue inductance in the energy storage system subsequent to a shut-off of the load, is completely absorbed by the capacitor. Hereby, no residue energy or residue inductance will be left in the system when opening the electric arc reducing associated contactor.

According to at least one example embodiment, the electric arc reducing circuitry is comprised in the contactor being associated with the electric arc reducing circuitry, in such a way that the contactor is equipped to break electric arcs.

Such contactor may be referred to as an electric arc breaking contactor. Thus, the residue energy or residue inductance in the energy storage system subsequent to a shut-off of the load, is handled by the electric arc breaking contactor, whereby the formation of electric arcs in the contactor is reduced or prevented, for example by the means of a permanent magnet and an isolator.

According to at least one example embodiment, the contactor being associated with the electric arc reducing circuitry is associated with the battery pack adjacent the load.

That is, the electric arc reducing associated contactor is configured to be arranged closest to the load. Stated differently, the electric arc reducing associated battery pack is arranged adjacent, and closest to the load. Hereby, the source of the residue energy or residue inductance will be close to the electric arc reducing circuitry.

According to at least one example embodiment, the switching arrangement comprises at least one secondary contactor arranged in parallel to the contactor being associated with the electric arc reducing circuitry, and wherein the secondary contactor is arranged in series with a pre-charge resistor.

Such contactor configuration is advantageous during start-up of the energy storage system. Thus, according to at least one example embodiment, the electric arc reducing circuitry is arranged in parallel with both the contactor being associated with the electric arc reducing circuitry and the corresponding secondary contactor. According to at least one example embodiment, the switching arrangement comprises such secondary contactor arranged in series with a corresponding pre-charge resistor, and being arranged in parallel for each of the contactors.

According to at least one example embodiment, the switching arrangement is configured to reduce contactor wear caused by inductance.

Thus, as previously described, the electric arc reducing circuitry may accumulated such inductance, or residue inductance.

The electric arc reducing circuitry may be referred to as an energy absorbing circuitry, or inductance absorbing circuitry. The load is typically an inductive load, and may e.g. be an electric machine, and the residue inductance remaining in the energy storage system subsequent to a shut-off of the electric machine may be the induced inductance by the electric machine. The plurality of battery packs may e.g. imply at least two, or at least three battery packs. The contactor may be defined as an electrically-controlled switch used for switching an electrical power circuit, wherein the electrical power circuit comprises the battery pack which the contactor serves to connect and disconnect relative the load.

According to at least one example embodiment, the energy storage system is an energy storage system for a vehicle, and thus the switching arrangement is a switching arrangement for reducing contactor wear of an energy storage system in a vehicle. According to at least one example embodiment, each battery pack comprises a plurality of series-connected and/or parallel connected battery cells.

According to a second aspect of the invention, an energy storage system for a vehicle is provided. The energy storage system comprises a plurality of battery pack arrangements arranged in parallel to power a load, and a switching arrangement according the first aspect of the invention, wherein each battery pack arrangement comprises a battery pack and an associated contactor of the switching arrangement arranged in series.

Effects and features of the second aspect of the invention are largely analogous to those described above in connection with the first aspect of the invention. Embodiments mentioned in relation to the first aspect of the invention are largely compatible with the second aspect of the invention, at least in relation to the switching arrangement, of which some embodiments are exemplified below.

Thus, the switching arrangement comprises at least:
a contactor for each battery pack, the contactors being configured to connect and disconnect the battery packs relative the load by closing and opening, respectively,
an electric arc reducing circuitry associated to one of the contactors, wherein the switching arrangement is configured to electrically disconnect the battery packs from the load by means of the contactors such that the contactor being associated with the electric arc reducing circuitry is opened last.

Thus, each battery pack arrangement comprises a battery pack and an associated contactor of the switching arrangement arranged in series, and one of the battery pack arrangement is an electric arc reducing associated battery pack arrangement comprising a battery pack, the contactor being associated with the electric arc reducing circuitry, and the electric arc reducing circuitry.

For example, the electric arc reducing associated battery pack arrangement may be arranged adjacent the load.

According to a third aspect of the invention, a vehicle is provided. The vehicle comprises the switching arrangement according to the first aspect of the invention, or an energy storage system according to the second aspect of the invention.

Effects and features of the third aspect of the invention are largely analogous to those described above in connection with the first aspect of the invention. Embodiments mentioned in relation to the first aspect of the invention are largely compatible with the third aspect of the invention, at least in relation to the switching arrangement.

According to a fourth aspect of the invention, a method for operating a switching arrangement for reducing contactor wear of an energy storage system is provided. The energy storage system comprises a plurality of battery packs arranged in parallel for powering a load, and the switching arrangement comprising a contactor for each battery pack, the contactors being configured to connect and disconnect the battery packs relative the load by closing and opening, respectively, and an electric arc reducing circuitry associated with one of the contactors. The method comprises:
disconnecting the battery packs from the load by means of the contactors such that the contactor being associated with the electric arc reducing circuitry is opened last.

Effects and features of the fourth aspect of the invention are largely analogous to those described above in connection with the first and second aspects of the invention. Embodiments mentioned in relation to the first and second aspects of the invention are largely compatible with the fourth aspect of the invention, at least in relation to the switching arrangement, of which some are mentioned below.

Thus, the energy storage system may be considered to comprise a plurality of battery pack arrangements arranged in parallel to power the load, and comprise the switching arrangement according the first aspect of the invention, wherein each battery pack arrangement comprises a battery pack and an associated contactor of the switching arrangement arranged in series. One of the battery pack arrangement is thus an electric arc reducing associated battery pack arrangement comprising a battery pack, the contactor being associated with the electric arc reducing circuitry, and the electric arc reducing circuitry.

According to at least one example embodiment, the method comprises: operating the switching arrangement according to a schema. The schema may e.g. comprise the step of disconnecting the battery packs from the load by means of the contactors such that the battery packs are disconnected in a sequence in which electric arc reducing associated contactor is opened last. The time interval for the disconnecting sequence may e.g. be between 0 and 10 s, such as e.g. between 1 ms and 5 s, or between 1 ms and 3 s, or between 1 ms and 1 s, i.e. between 1 ms and 1000 ms, or between 100 ms and 1000 ms. For example, the method may comprise: disconnecting all of the battery packs from the load by means of the contactors except for the electric arc reducing associated contactor simultaneously, or almost simultaneously (e.g. within 50 ms). The method may further comprise: intentionally opening the electric arc reducing associated contactor last (e.g. by applying a lag compared to opening the other contactors).

According to at least one example embodiment, the method comprises: electrically connecting the battery packs to the load by means of the contactors. That is, the contactors are closed to connect the battery packs to the load. According to at least one example embodiment, at least the electric arc reducing associated battery pack is connected to power the load. All of the battery packs need not to be connected each time, but preferably the electric arc reducing associated battery pack is connected each time as the electric arc reducing associated contactor is configured for achieving the reduced contactor wear.

According to at least one example embodiment, the contactor being associated with the electric arc reducing circuitry is arranged adjacent and in parallel to the electric arc reducing circuitry.

According to at least one example embodiment, the electric arc reducing circuitry is a snubber circuit.

According to at least one example embodiment, the electric arc reducing circuitry is comprised in the contactor being associated with the electric arc reducing circuitry, in such a way that the contactor is equipped to break electric arcs.

According to at least one example embodiment, the method is performed to reduce contactor wear caused by inductance by means of electric arc reducing circuitry.

That is, the switching arrangement is configured to perform the steps of the method of the fourth aspect of the invention.

According to at least a fifth aspect of the present invention, a computer program is provided. The computer program comprises program code means for performing the method of the fourth aspect of the invention, when the program is run on a computer.

Such computer program may e.g. be implemented in an ECU of the vehicle, or e.g. be comprised in a control unit of the switching arrangement.

According to at least a sixth aspect of the present invention, a computer readable medium carrying a computer program comprising program code means for performing the method of the fourth aspect of the invention, when the program product is run on a computer, is provided.

According to at least a seventh aspect of the present invention, use of an electric arc reducing circuitry for reducing contactor wear during the disconnection of a plurality of battery packs relative a load is provided. The electric arc reducing circuitry is associated to one of the contactors, wherein the corresponding battery pack is electrically disconnected from the load such that the contactor being associated with the electric arc reducing circuitry is opened last.

The use of the electric arc reducing circuitry may e.g. be implemented to the switching arrangement of the first aspect of the invention. The electric arc reducing circuitry may e.g. be a snubber circuit.

According to at least one example embodiment, applicable to any one of the first to seventh aspects of the invention, the battery packs are adapted for a vehicle, such as e.g. a heavy duty truck.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
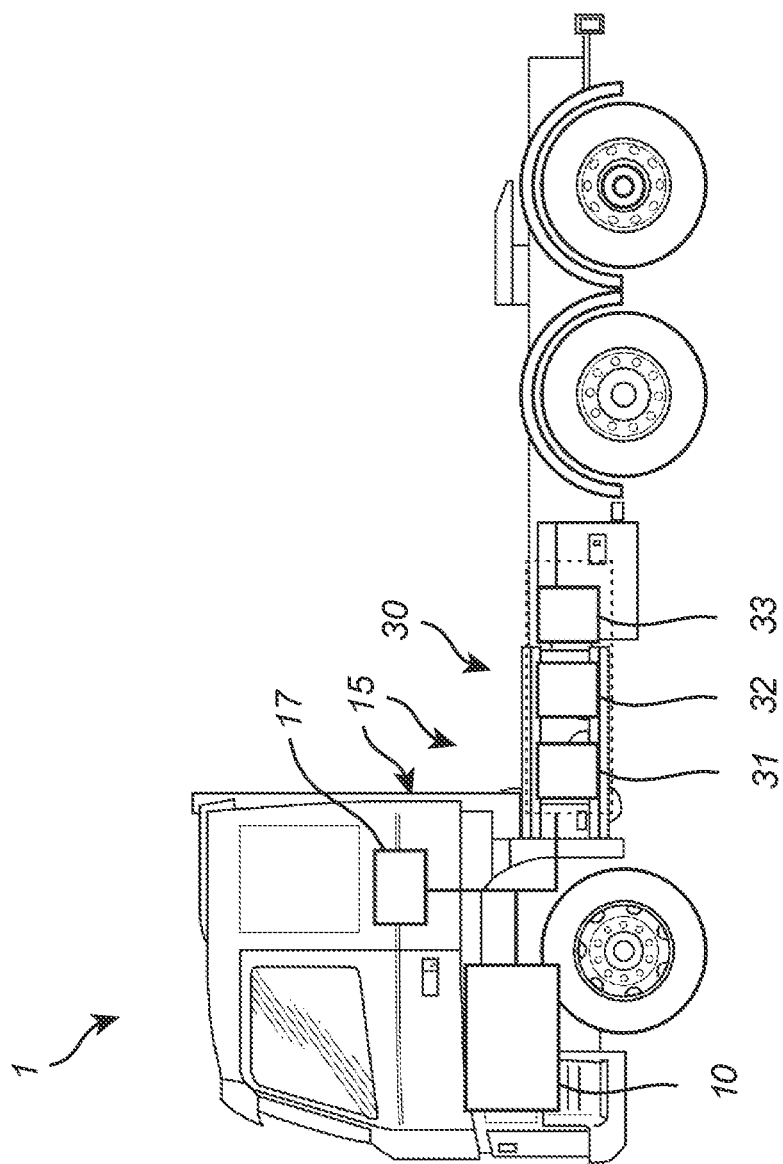
FIG. 1 is a schematic side view of a vehicle comprising a switching arrangement and an energy storage system, in accordance with example embodiments of the invention.

With reference to FIG. 1, a vehicle 1, here embodied as a heavy duty truck 1, is disclosed for which a method, switching arrangement 15, and/or energy storage system 30 of a kind disclosed in the present invention is advantageous. However, the method, the switching arrangement 15 or energy storage system 30 may as well be implemented in other types of vehicles, such as in busses, light-weight trucks, passenger cars, marine applications etc. The vehicle 1 is an electric vehicle, such as a full electric vehicle or a hybrid, comprising at least one electric machine 10 powered by the energy storage system 30, wherein in the example of FIG. 1, the energy storage system comprises three energy storage devices 31, 32, 33, or battery packs 31, 32, 33. The switching arrangement 15 is configured to connected and disconnect the battery packs 31, 32, 33 relative the electric machine 10. Moreover, the switching arrangement 15 comprises a control unit 17 arranged and configured for controlling the operation of the switching arrangement 15. The vehicle 1 typically further comprises other parts of the powertrain such as transmission, drive shafts and wheels (not shown in detail).

Figure 2:
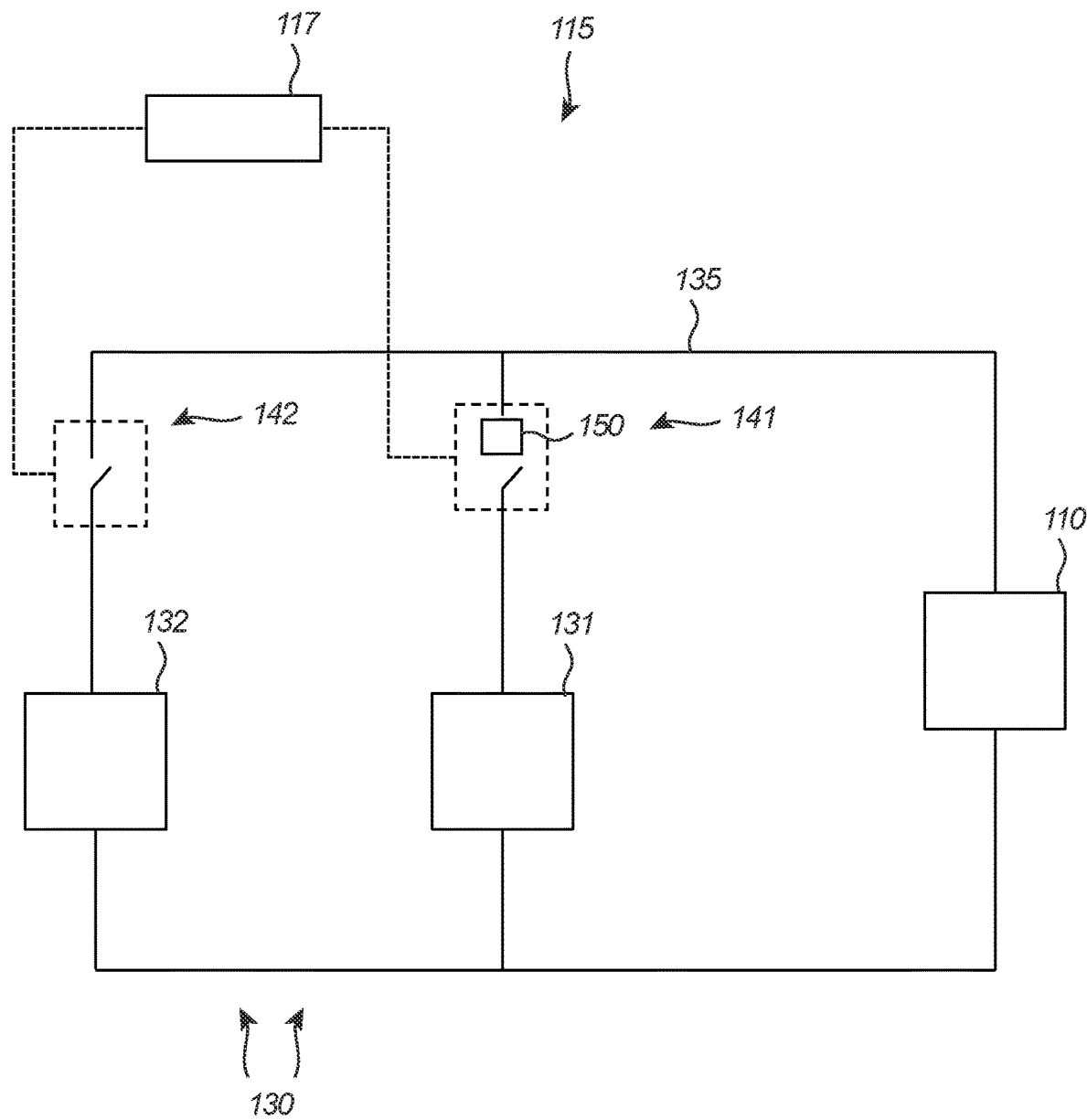
FIG. 2 is a schematic view of a switching arrangement for energy storage system having a plurality of battery packs arranged in parallel for powering a load, in accordance with an example embodiment of the invention.

FIG. 2 is a schematic view of a switching arrangement 115 and an energy storage system 130 having a plurality of battery packs 131, 132 arranged in parallel for powering a load 110. The embodiment shown in FIG. 2 may be implemented in the vehicle 1 of FIG. 1, and thus the switching arrangement 115, the energy storage system 130 and the load 110 of FIG. 2, may correspond to the switching arrangement 15, the energy storage system 30 and the electric machine 10 of FIG. 1. Thus, the load 110 in FIG. 2 may be an electric machine.

The energy storage system 130 comprises a first battery pack 131 and a second battery pack 132, but it should be noted that any number of battery packs may be included in the energy storage system 130, e.g. at least three battery packs. The switching arrangement 115 comprises a first contactor 141 configured to connect and disconnect the first battery pack 131 relative the load 110 by closing and opening, respectively, and comprises a second contactor 142 configured to connect and disconnect the second battery pack 132 relative the load 110 by closing and opening, respectively. As shown in FIG. 2, the first and the second battery packs 131, 132 may be connected to the load 110 via a common traction power bus 135 arranged between the first and second contactors 141, 142 and the load 110. The first contactor 141, and the corresponding first battery pack 131, are arranged adjacent load 110, while the second contactor 142, and the corresponding second battery pack 132, are arranged further from the load 110. The load 110 may be powered by both the first and the second battery packs 131, 132 by closing the first and the second contactors 141, 142, (i.e. by connecting the first and second battery packs 131, 132 to the load 110) and the first and second battery packs 131, 132 may be disconnected from the load 110 by opening the first and second contactors 141, 142. The switching arrangement 115 comprises a control unit 117 arranged and configured for controlling the operation of the switching arrangement 115, which is further described with reference to the flow chart of FIG. 4.

The switching arrangement 115 further comprises an electric arc reducing circuitry 150 associated to the first contactor 141. The electric arc reducing circuitry 150 is schematically illustrated in FIG. 2, and is configured to accumulate any residue energy, or residue inductance, in the energy storage system 130 subsequent to a shut-off of the load, as will be described in the following.

When a load, such as the load 110 of FIG. 2 or electric machine 10 of FIG. 1, is shut-off, residue inductance is still present in the system. When disconnecting the battery packs 131, 132, such residue inductances may result in sharp rises in voltage across the first and/or second contactor 141, 142. Especially for the contactor which opens last, the sharp rises in voltage may result in the formation of an electronic arc, causing contactor wear, or electric contactor wear. By controlling the sequence in which the battery packs 131, 132 are disconnected, the contactor being associated with the electric arc reducing circuitry 150, i.e. the first contactor 141 in FIG. 2, can be set to open last. Hereby, the formation of electronic arcs across the first contactor 141 can be reduced or even prevented, as the electric arc reducing circuitry 150 is configured to accumulate the residue inductance. In other words, the switching arrangement 115 is configured to electrically disconnect the first and second battery packs 131, 132 from the load 110 by means of the first and second contactors 141, 142, such that the first contactor 141 being associated with the electric arc reducing circuitry 150 is opened last. Moreover, the formation of electronic arcs across any other contactor in the switching arrangement is reduced or even prevented, as the electric arc reducing circuitry 150 is configured to accumulate the residue inductance.

The electric arc reducing circuitry 150 may be comprised in the first contactor 141 in such a way that the contactor 141 may be referred to as being equipped to break electric arcs. The first contactor 141 may thus be referred to as an electric arc breaking contactor 141 comprising the electric arc reducing circuitry 150. Thus, the residue energy or residue inductance in the energy storage system 130 subsequent to a shut-off of the load 120, is handled by the electric arc breaking contactor 141, whereby the formation of electric arcs in the contactor 141 is reduced or prevented.

Figure 3:
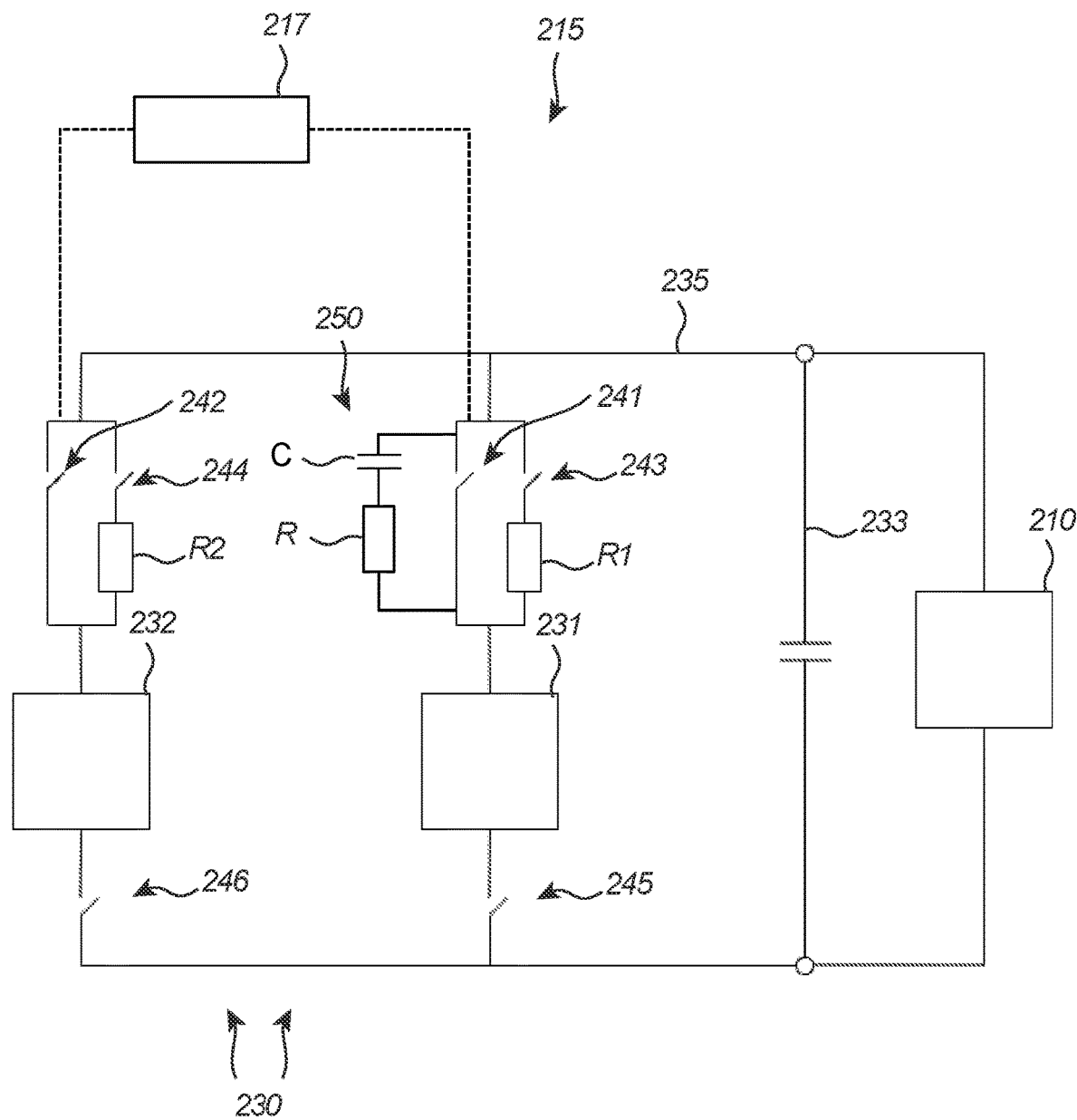
FIG. 3 is a schematic view of a switching arrangement and an energy storage system having a plurality of battery packs arranged in parallel for powering a load in accordance with another example embodiment of the invention.

FIG. 3 is a schematic view of a yet another switching arrangement 215 and an energy storage system 230 having a plurality of battery packs 231, 232 arranged in parallel for powering a load 210. The embodiment shown in FIG. 3 may be implemented in the vehicle 1 of FIG. 1, and thus the switching arrangement 215, the energy storage system 230 and the load 210 of FIG. 3, may correspond to the switching arrangement 15, the energy storage system 30 and the electric machine 10 of FIG. 1. Thus, the load 210 in FIG. 3 may be an electric machine.

As in FIG. 2, the energy storage system 230 of FIG. 3 comprises a first battery pack 231 and a second battery pack 232, but it should be noted that any number of battery packs may be included in the energy storage system 230, e.g. at least three battery packs. As the energy storage system 230 of FIG. 3 is in large corresponding to the energy storage system 130 of FIG. 2, the configuration thereof is not repeated here again. However, the energy storage system 230 if FIG. 3 comprises a capacitor circuitry 233 arranged in parallel to, and between, the battery packs 231, 232 and the load 210. The capacitor circuitry 233 is configured to handle averaging of the pulse-width-modulation voltage.

The switching arrangement 215 of FIG. 3 comprises a first contactor 241 configured to connect and disconnect the first battery pack 231 relative the load 210 by closing and opening, respectively, and comprises a second contactor 242 configured to connect and disconnect the second battery pack 232 relative the load 210 by closing and opening, respectively. The first contactor 241, and the corresponding first battery pack 231 arranged in series with the first contactor 241 may be referred to as a first battery pack arrangement, while the second contactor 242, and the corresponding second battery pack 232 arranged in series with the second contactor 242, may be referred to as a second battery pack arrangement. In FIG. 3, the first battery pack arrangement is arranged closest to the load 210. The load 210 may be powered by both the first and the second battery packs 231, 232 by closing the first and the second contactors 241, 242, and transferring electricity via a common traction power bus 235 arranged between the first and second contactors 241, 242 and the load 110. Correspondingly, the first and second battery packs 231, 232 may be disconnected from the load 210 by opening the first and second contactors 241, 242. The switching arrangement 215 comprises a control unit 217 arranged and configured for controlling the operation of the switching arrangement 215, which is further described with reference to the flow chart of FIG. 4.

The switching arrangement 230 in FIG. 3 further comprises a first secondary contactor 243 arranged in parallel to the first contactor 241, wherein the first secondary contactor 243 is arranged in series with a first pre-charge resistor R1. Correspondingly, the switching arrangement 230 comprises a second secondary contactor 244 arranged in parallel to the second contactor 242, wherein the second secondary contactor 244 is arranged in series with a second pre-charge resistor R2. Moreover, in FIG. 3, the first battery pack 231 is connected in series with a first pre-contactor 245, and the second battery pack 232 is connected in series with a second pre-contactor 246. The first and second pre-contactors 245, 245 are arranged on an opposite side of the respective battery pack as compared to the first and second contactors 241, 242.

As in FIG. 2, the switching arrangement 215 further comprises an electric arc reducing circuitry 250 associated to the first contactor 241, wherein the electric arc reducing circuitry 250 is configured to accumulate any residue energy, or residue inductance, in the energy storage system subsequent to a shut-off of the load, as described with reference to FIG. 2. Thus, the switching arrangement 215 of FIG. 3 is configured to electrically disconnect the first and second battery packs 231, 232 from the load 210 by means of the first and second contactors 241, 242, such that the first contactor 241 being associated with the electric arc reducing circuitry 250 is opened last. In FIG. 3, the first contactor 241 is arranged adjacent and in parallel to the electric arc reducing circuitry 250.

In FIG. 3, the electric arc reducing circuitry 250 is embodied as a snubber circuit 250, and in particular an RC snubber circuit 250 comprising an RC circuit of a capacitor C connected in series with a resistor R. This circuit configuration is simple but yet effective for handling the residue inductance as previously described. The RC snubber circuit is in particular advantageous as the capacitor C may be sized and dimensioned to handle the residue inductance in the particular energy storage system 230, i.e. corresponding to the load 210 and any associated equipment.

Figure 4:
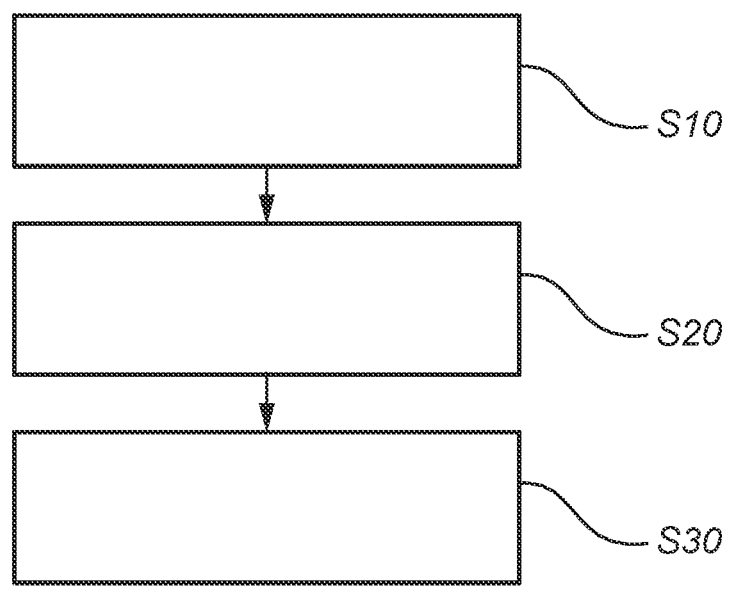
FIG. 4 is a flowchart illustrating the steps of a method in accordance with example embodiments of the invention.

The operation of a switching arrangement, as the switching arrangement 115, 215 of FIG. 2 and FIG. 3, will now be described in more general terms with additional reference to FIG. 4. FIG. 4 is a flowchart describing the steps of a method for operating the switching arrangement for reducing contactor wear of an energy storage system. The steps of the method may e.g. be implemented in the control unit 117, 217 of the switching arrangement 115, 215, in order to control the operation of the switching arrangement 115, 215 and the connection and disconnection of the battery packs 131, 132, 231, 232. Thus, FIG. 4 discloses a method for operating a switching arrangement for reducing contactor wear of an energy storage system having a plurality of battery packs arranged in parallel for powering a load, the switching arrangement comprising a contactor for each battery pack, the contactors being configured to connect and disconnect the battery packs relative the load by closing and opening, respectively, and an electric arc reducing circuitry associated with one of the contactors.

In a first step S10, the battery packs are disconnected from the load by means of the contactors such that the contactor being associated with the electric arc reducing circuitry is opened last. Hereby, the electric arc reducing circuitry accumulates any residue energy, or residue inductance, in the energy storage system subsequent to a shut-off of the load, and electric wear originating at least from the formation of electric arcs is reduced or even omitted.

According to at least one example embodiment, and as mentioned in the embodiment of FIG. 3, the contactor being associated with the electric arc reducing circuitry is arranged adjacent and in parallel to the electric arc reducing circuitry. For example, the electric arc reducing circuitry is a snubber circuit. Thus, the first step S10 of disconnecting the battery packs from the load by means of the contactors, implies directing any residue energy or residue inductance, away from the contactors and into the arc reducing circuitry.

According to at least one example embodiment, and as mentioned in the embodiment of FIG. 2, the electric arc reducing circuitry is comprised in the contactor being associated with the electric arc reducing circuitry, in such a way that the contactor is equipped to break electric arcs. Thus, the first step S10 of disconnecting the battery packs from the load by means of the contactors, implies directing any residue energy or residue inductance, into the contactor being associated with the electric arc reducing circuitry.

In a second step S20, which may comprise the first step S10, or be performed just prior to the first step S10, the switching arrangement is operated according to a schema. The schema may e.g. comprise the step of disconnecting the battery packs from the load by means of the contactors in a certain sequence or order. Typically, the schema comprises disconnecting the battery packs from the load such that the battery packs are disconnected in a sequence in which electric arc reducing associated contactor is opened last. The time interval for the disconnecting sequence may e.g. be between 0 and 10 s, such as e.g. between 1 ms and 5 s, or between 1 ms and 3 s, or between 1 ms and 1 s, i.e. between 1 ms and 1000 ms, or between 100 ms and 1000 ms. For example, the second step S20 may be performed in the following manner: disconnecting all of the battery packs from the load by means of the contactors except for the electric arc reducing associated contactor simultaneously, or almost simultaneously (e.g. within 50 ms), and then disconnect the electric arc reducing associated contactor. Thus, the electric arc reducing associated contactor is intentionally opened last (e.g. by applying a lag compared to opening the other contactors).

In a third step S30, the battery packs are electrically connected to the load by means of the contactors. For example, the switching arrangement is operated according to a schema in a corresponding manner as in the second step S20. The schema may e.g. comprise the step of connecting the battery packs to the load by means of the contactors in a certain sequence or order. That is, the contactors are closed to connect the battery packs to the load. According to at least one example embodiment, at least the electric arc reducing associated battery pack is connected to power the load. All of the battery packs need not to be connected each time, but preferably the electric arc reducing associated battery pack is connected each time as the electric arc reducing associated contactor is configured for achieving the reduced contactor wear.

It should be noted that the naming of the steps not necessarily, but might according to at least one example embodiment, relate to the order in which the steps are carried out. Thus, the order of the steps may be different than that explained here, and the switching arrangement of FIG. 2 and FIG. 3 may be configured to carry out one or several of the steps. Moreover, one or more of the steps may be combined and carried out simultaneously.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A switching arrangement for reducing contactor wear of an energy storage system having a plurality of battery packs arranged in parallel for powering a load, the switching arrangement comprising:
   a contactor for each battery pack, the contactor being configured to connect and disconnect the battery packs relative to the load by closing and opening, respectively,
   an electric arc reducing circuitry associated to one of the contactor, wherein the switching arrangement is configured to electrically disconnect the battery packs from the load by means of the contactor such that the contactor being associated with the electric arc reducing circuitry is opened last.

2. The switching arrangement according to claim 1, wherein the contactor being associated with the electric arc reducing circuitry is arranged adjacent and in parallel to the electric arc reducing circuitry.

3. The switching arrangement according to claim 1, wherein the electric arc reducing circuitry is a snubber circuit.

4. The switching arrangement according to claim 3, wherein the snubber circuit is an RC circuit of a capacitor connected in series with a resistor.

5. The switching arrangement according to claim 4, wherein the capacitor is sized and dimensioned to handle the residue inductance in the energy storage system.

6. The switching arrangement according to claim 1, wherein the electric arc reducing circuitry is comprised in the contactor being associated with the electric arc reducing circuitry, in such a way that the contactor is equipped to break electric arcs.

7. The switching arrangement according to claim 1, wherein the contactor being associated with the electric arc reducing circuitry is associated with the battery pack adjacent the load.

8. The switching arrangement according to claim 1, wherein the switching arrangement comprises at least one secondary contactor arranged in parallel to the contactor being associated with the electric arc reducing circuitry, and wherein the secondary contactor is arranged in series with a pre-charge resistor.

9. The switching arrangement according to claim 1, wherein the switching arrangement is configured to reduce contactor wear caused by inductance.

10. An energy storage system for a vehicle, the energy storage system comprising a plurality of battery pack arrangements arranged in parallel to power a load, and a switching arrangement according to claim 1, wherein each battery pack arrangement comprises a battery pack and an associated contactor of the switching arrangement arranged in series.

11. A vehicle comprising the switching arrangement according to claim 1.

12. A method for operating a switching arrangement for reducing contactor wear of an energy storage system having a plurality of battery packs arranged in parallel for powering a load, the switching arrangement comprising a contactor for each battery pack, the contactor being configured to connect and disconnect the battery packs relative to the load by closing and opening, respectively, and an electric arc reducing circuitry associated with one of the contactor, the method comprising: disconnecting the battery packs from the load by means of the contactor such that the contactor being associated with the electric arc reducing circuitry is opened last.

13. The method according to claim 12, wherein the contactor being associated with the electric arc reducing circuitry is arranged adjacent and in parallel to the electric arc reducing circuitry.

14. The method according to claim 12, wherein the electric arc reducing circuitry is a snubber circuit.

15. The method according to claim 12, wherein the electric arc reducing circuitry is comprised in the contactor being associated with the electric arc reducing circuitry, in such a way that the contactor is equipped to break electric arcs.

* * * * *